US012190777B2

(12) United States Patent
Isobe

(10) Patent No.: US 12,190,777 B2
(45) Date of Patent: Jan. 7, 2025

(54) METHOD AND APPARATUS FOR DISPLAYING IMAGE ON IMAGE DISPLAY DEVICE

(71) Applicant: Huawei Technologies Co., Ltd., Shenzhen (CN)

(72) Inventor: Teppei Isobe, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/315,731

(22) Filed: May 11, 2023

(65) Prior Publication Data

US 2023/0282149 A1 Sep. 7, 2023

Related U.S. Application Data

(63) Continuation of application No. PCT/CN2020/127933, filed on Nov. 11, 2020.

(51) Int. Cl.
*G09G 3/20* (2006.01)
*G09G 3/3208* (2016.01)

(52) U.S. Cl.
CPC ......... *G09G 3/2051* (2013.01); *G09G 3/2055* (2013.01); *G09G 3/3208* (2013.01); *G09G 2320/0233* (2013.01); *G09G 2320/0247* (2013.01); *G09G 2320/0271* (2013.01)

(58) Field of Classification Search
CPC .. G09G 3/2051; G09G 3/2055; G09G 3/3208; G09G 2320/0233; G09G 2320/0247; G09G 2320/0271
See application file for complete search history.

(56) References Cited

U.S. PATENT DOCUMENTS 4,980,678 A * 12/1990 Zenda .................. G09G 3/2007 345/3.1
6,108,122 A * 8/2000 Ulrich .................. G09G 3/3629 345/589
7,110,010 B1 * 9/2006 Masuji ................. G09G 3/2055 345/698
7,710,440 B2 * 5/2010 Masuji ................. G09G 3/2055 348/517
7,956,874 B2 * 6/2011 Seong .................. G09G 3/2059 345/596
10,475,368 B2 * 11/2019 Park ..................... G09G 3/3426
10,593,252 B1 3/2020 Chappalli
11,521,538 B2 * 12/2022 Jo ........................ G09G 3/2044
(Continued)

FOREIGN PATENT DOCUMENTS

CN 1577427 A 2/2005
CN 101165757 A 4/2008
(Continued)

*Primary Examiner* — Gene W Lee
(74) *Attorney, Agent, or Firm* — Conley Rose, P.C.

(57) ABSTRACT

A method for displaying an image on an image displaying device includes the steps of: comparing gray scale level of an image signal for the light emitting element with given threshold level; and when the gray scale level is higher than the threshold level, driving the light emitting element by a driving signal corresponding to the gray scale level, and when the gray scale level is lower than the threshold level, driving the light emitting element by a dithering driving signal including a driving signal corresponding to the threshold level.

20 Claims, 10 Drawing Sheets

(56) References Cited

U.S. PATENT DOCUMENTS

| | | | | |
|---|---|---|---|---|
| 2003/0179171 | A1* | 9/2003 | Toriumi | G09G 3/3688 345/89 |
| 2005/0057173 | A1 | 3/2005 | Suzuki et al. | |
| 2006/0256100 | A1* | 11/2006 | Masuji | G09G 3/2055 345/204 |
| 2007/0075928 | A1* | 4/2007 | Takeuchi | G09G 3/2059 345/63 |
| 2008/0144112 | A1 | 6/2008 | Moon | |
| 2009/0244108 | A1 | 10/2009 | Park | |
| 2012/0169777 | A1 | 7/2012 | Budni et al. | |
| 2017/0092189 | A1 | 3/2017 | Hwang | |
| 2018/0144676 | A1 | 5/2018 | Nadershahi | |

FOREIGN PATENT DOCUMENTS

| | | | |
|---|---|---|---|
| CN | 101546513 | A | 9/2009 |
| CN | 107993609 | A | 5/2018 |
| CN | 108573678 | A | 9/2018 |
| CN | 110178172 | A | 8/2019 |
| KR | 20200076317 | A | 6/2020 |

* cited by examiner

FIG. 3

| | | | | | | | | | | | | | | | | |
|---|---|---|---|---|---|---|---|---|---|---|---|---|---|---|---|---|
| | 0 | 0 | th | 0 | 0 | th | 0 | 0 | th | 0 | 0 | 0 | 0 | 0 | 0 | th |
| | 0 | th | 0 | 0 | th | 0 | 0 | 0 | 0 | 0 | 0 | th | 0 | 0 | th | 0 |
| | th | 0 | 0 | 0 | 0 | 0 | 0 | th | 0 | 0 | th | 0 | 0 | th | 0 | 0 |
| | 0 | 0 | 0 | th | 0 | 0 | th | 0 | 0 | th | 0 | 0 | th | 0 | 0 | 0 |
| t(frame) | 1 | | | | 2 | | | | 3 | | | | 4 | | | |

FIG. 4

| | | | | | | | | | | | | | | | | |
|---|---|---|---|---|---|---|---|---|---|---|---|---|---|---|---|---|
| | 0 | th | 0 | th | th | 0 | th | 0 | 0 | th | 0 | th | th | 0 | th | 0 |
| | th | 0 | th | 0 | 0 | th | 0 | th | th | 0 | th | 0 | 0 | th | 0 | th |
| | 0 | th | 0 | th | th | 0 | th | 0 | 0 | th | 0 | th | th | 0 | th | 0 |
| | th | 0 | th | 0 | 0 | th | 0 | th | th | 0 | th | 0 | 0 | th | 0 | th |
| t(frame) | 1 | | | | 2 | | | | 3 | | | | 4 | | | |

FIG. 5

| | | | | | | | | | | | | | | | | |
|---|---|---|---|---|---|---|---|---|---|---|---|---|---|---|---|---|
| | 0 | th | th | th | th | th | th | 0 | th | th | 0 | th | th | 0 | th | th |
| | th | th | th | 0 | th | th | 0 | th | th | 0 | th | th | 0 | th | th | th |
| | th | th | 0 | th | th | 0 | th | th | 0 | th | th | th | th | th | th | 0 |
| | th | 0 | th | th | 0 | th | th | th | th | th | th | 0 | th | th | 0 | th |
| t(frame) | 1 | | | | 2 | | | | 3 | | | | 4 | | | |

FIG. 6
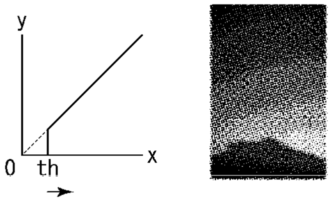
FIG. 7
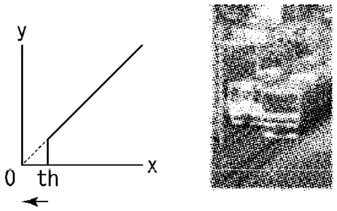
FIG. 8
th=6
| t | | 1 | 2 | 3 | 4 | 5 | x |
|---|---|---|---|---|---|---|---|
| | 1 | 0 | 2 | 4 | 5 | 6 | |
| | 2 | 1 | 1 | 2 | 3 | 4 | |
| | 3 | 3 | 3 | 3 | 4 | 5 | |
| | 4 | 2 | 1 | 4 | 5 | 6 | |
| | 5 | 0 | 2 | 2 | 3 | 4 | |
| | 6 | 0 | 3 | 3 | 4 | 5 | Dither pattern |
| average | | 1 | 2 | 3 | 4 | 5 | y |

METHOD AND APPARATUS FOR DISPLAYING IMAGE ON IMAGE DISPLAY DEVICE

CROSS-REFERENCE TO RELATED APPLICATIONS

This application is a continuation of International Patent Application No. PCT/CN2020/127933 filed on Nov. 11, 2020, which is hereby incorporated by reference in its entirety.

TECHNICAL FIELD

The present disclosure relates to a method and an apparatus for displaying a two-dimensional (2D) image on a 2D image display device, and in particular, to a method and an apparatus for improving quality of the image displayed on the image display device.

BACKGROUND

Recently, a 2D image display device using light-emitting elements such as organic light-emitting diodes (OLEDs) has been used for smart phones, etc. On such a display device, a plurality of pixels including the light emitting elements such as OLEDs are arranged in the form of a matrix.

A recent smart phone comprises a camera, and an image taken by the camera is displayed on the display device. High quality is required for the displayed image.

Variation of luminance and color for each pixel may occur. FIG. 1 shows appearance of unevenness at different display positions and compensations of unevenness. Compensating for this variation requires high technology and high cost.

In one approach, a display method changing in response to whether a gray scale value for a pixel of a display device is higher than a threshold value or not was disclosed. The threshold value is determined in accordance with screen size and peak luminance.

Another approached relates to a method for driving a display device with an analog and digital hybrid driving. The analog driving controls driving voltage of the display device, and the digital driving controls light emitting period.

SUMMARY

An OLED is driven by a driving thin-film transistor (TFT). Threshold voltage Vth of the driving TFT may include variation. Thereby, unevenness may appear in an image displayed on a display device. In particular, the unevenness may be noticeable when an OLED (a pixel) is driven on a low luminance level.

According to the present disclosure, an OLED (a pixel) is not driven on a luminance level (a gray scale level) lower than a given threshold level th. A luminance level (a gray scale level) lower than the given threshold level th is implemented by dithering. This dithering includes temporal dithering and spatial dithering.

The threshold level is determined in accordance with the type of a displayed image and total luminance (average luminance) of the displayed image. The type of an image includes a still image or moving images. High threshold level thH is set for still images, and low threshold level thL is set for moving images. When the type of an image is a still image and total luminance (average luminance) of the image is lower than the reference luminance, higher threshold level thHH is set. That is, thL<thH<thHH.

According to a first aspect of the present disclosure, a method for displaying an image on an image displaying device, the image displaying device comprises a plurality of pixels including light emitting elements, the method includes steps of: comparing gray scale level of an image signal for the light emitting element with a given threshold level; and when the gray scale level is higher than the threshold level, driving the light emitting element by a driving signal corresponding to the gray scale level, and when the gray scale level is lower than the threshold level, driving the light emitting element by a dithering driving signal including a driving signal corresponding to the threshold level.

According to a second aspect of the present disclosure, an apparatus for displaying an image on a display device, the image displaying device comprises a plurality of pixels including light emitting elements, the apparatus comprises: a comparing unit for comparing gray scale level of an image signal for the light emitting element with a given threshold level; a selecting unit for selecting a driving signal corresponding to the gray scale level when the gray scale level is higher than the threshold level, and selecting a dithering driving signal including a driving signal corresponding to the threshold level when the gray scale level is lower than the threshold level; and a driving unit for driving the light emitting element by the driving signal or the dithering driving signal.

BRIEF DESCRIPTION OF DRAWINGS

FIG. 3 shows a dithering pattern for gray scale level x=1.

FIG. 4 shows a dithering pattern for gray scale level x=2.

FIG. 5 shows a dithering pattern for gray scale level x=3.

FIG. 6 shows an example of increasing threshold level th.

FIG. 7 shows an example of decreasing threshold level th.

FIG. 8 shows an exemplary dithering pattern with threshold level th=6, in which gray scale levels are changed every frame.

DESCRIPTION OF EMBODIMENTS

Figure 1:
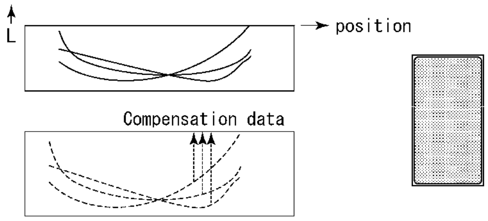
FIG. 1 shows appearance of unevenness at different display positions and compensations of unevenness.
Figure 2:
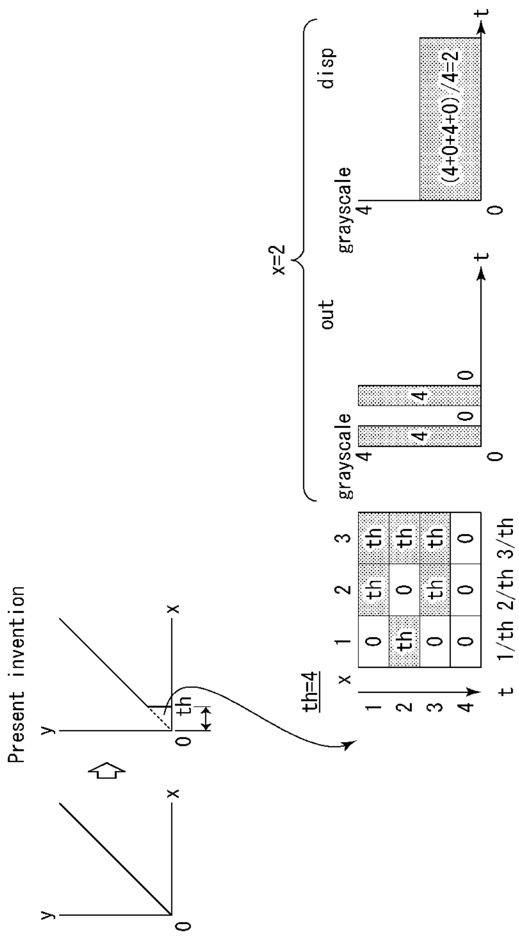
FIG. 2 shows light emitting patterns for a low gray scale level with threshold level th=4.

FIG. 2 shows a method for displaying a 2D image on a 2D image display device. On the 2D image display device, a plurality of pixels are arranged in the form of a matrix. Each pixel includes a light emitting element such as an OLED. However, a light emitting element in the present disclosure is not limited to an OLED. Conventionally, the light emitting element emits light of luminance y in proportion to gray scale level x. In the present disclosure, a threshold level th is set. When a gray scale level is higher than the threshold level, the light emitting element emits light of luminance y in proportion to gray scale level x. When a gray scale level is lower than the threshold level, the light emitting element emits light using dithering. FIG. 2 shows light emitting patterns of temporal dithering with threshold level th=4. In this temporal dithering, each light emitting element emits light 4 times of Frames 1 to 4. For example, when an image of gray scale level x=2 is displayed, the element emits light of luminance corresponding to threshold level th=4 for Frame 1, the element does not emit light for Frame 2, the element emits light of luminance corresponding to threshold level th=4 for Frame 3, and the element does not emit light for Frame 4. Such a temporal dithering results in average gray scale level x=2. This example uses threshold level and level 0 (no light emitting) only. However, another example can use threshold level and a level other than level 0, such as level 1, 2, or 3.

FIGS. 3 to 5 show temporal and spatial dithering for low gray scale levels with threshold level th=4 using 4×4 elements (pixels) and Frames 1 to 4. FIG. 3 shows a dithering pattern in order to display an image of gray scale level x=1, FIG. 4 shows a dithering pattern in order to display an image of gray scale level x=2, and FIG. 5 shows a dithering pattern in order to display an image of gray scale level x=3.

The threshold level th can be adjusted depending on a type of a displayed image (a still image or moving images) and total luminance (average luminance) of the image. FIG. 6 shows a case of increasing the threshold level. When a type of the image is a still image, a high threshold level thH is set. When the type of the image is a still image and total luminance of the image is lower than the reference luminance, a higher threshold level thHH is set. That is, thH<thHH.

FIG. 7 shows a case of decreasing the threshold level. When the type of the image is moving images, a low threshold level thL is set. That is, thL<thH<thHH.

In terms of image quality, it is preferable that the threshold level is set to 8 to 10.

FIG. 8 shows another dithering pattern with threshold level th=6, in which gray scale levels are changed for every Frame. For example, when an image of gray scale level x=2 is displayed, gray scale level 2 is displayed for Frame 1, gray scale level 1 is displayed for Frame 2, gray scale level 3 is displayed for Frame 3, gray scale level 1 is displayed for Frame 4, gray scale level 2 is displayed for Frame 5, and gray scale level 3 is displayed for Frame 6. Such dithering results in average gray scale level x=2. In order to prevent a flicker, a changing range of gray scale levels should be limited. In this example, the changing range for average gray scale level x=2 is limited within the range from gray scale level 1 to gray scale level 3.

Figure 9:
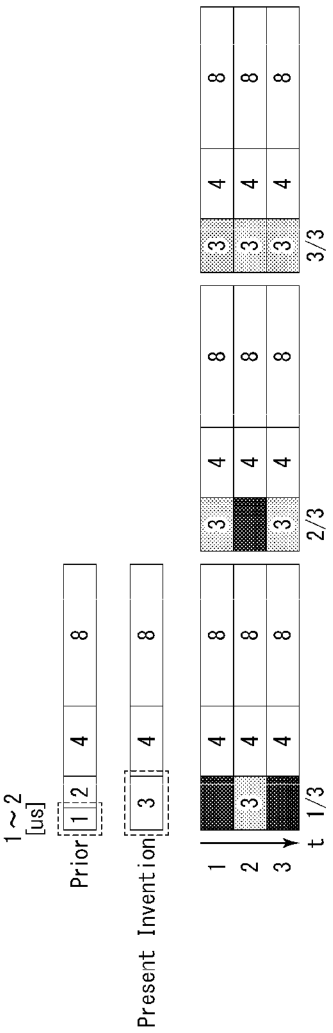
FIG. 9 shows an exemplary dithering pattern using subfield pulse width modulation (PWM).

FIG. 9 shows an example of sub-field PWM in which dithering of low gray scale level is applied. Conventionally, very short light-emitting period is needed for displaying an image of low gray scale level using sub-field PWM. In this example, two light-emitting periods for least significant 2 bits are combined, and the light emitting is divided into Frames 1 to 3. For example, in order to display an image of gray scale level 1, light is not emitted during the combined period for Frame land for Frame 3 but is emitted during the combined period for Frame 2. Such dithering results in average gray scale level x=1. This example produces the effect of easing of constraints for a source driver, pixel circuits, and peripheral circuits. Lengthening a sub-field period makes design of a digital-to-analog converter (DAC) and an amplifier in the driver easy.

Figure 10:
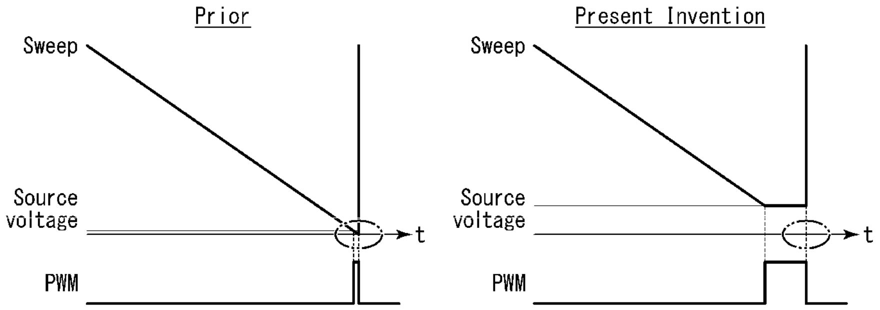
FIG. 10 shows a process for converting source voltage into a light-emitting pulse.

FIG. 10 shows a process for converting source voltage into a light-emitting pulse. Source voltage and sweep voltage are inputted into a comparator, and the comparator outputs a PWM pulse having pulse width depending on source voltage. In this example, a gray scale level lower than the threshold level is not used. Thus, minimum source voltage is kept at a usable level, and minimum pulse width is kept at a usable width. Furthermore, light-emitting performance is improved since a response of an element is improved and noise is reduced. Heightening the minimum source voltage makes design easy.

Figure 11:
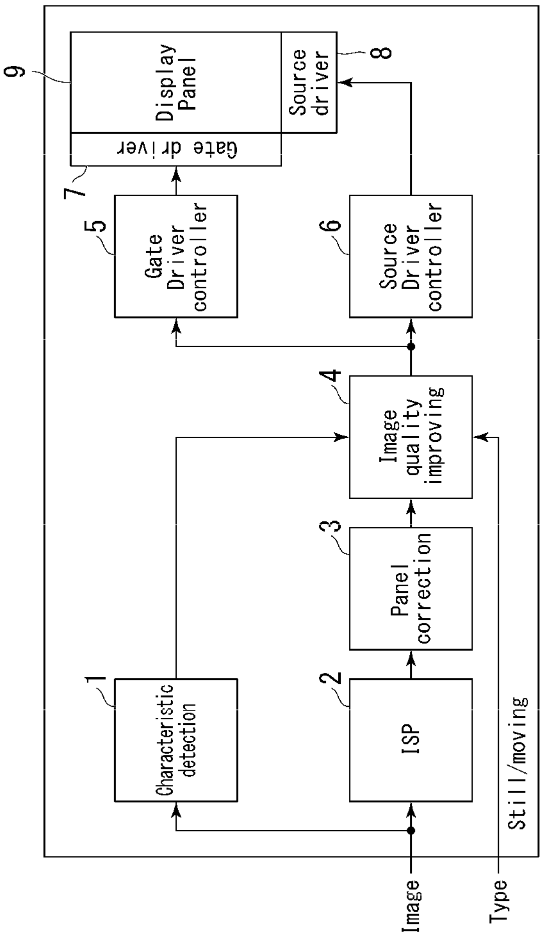
FIG. 11 shows a block diagram of an image display apparatus according to the present disclosure.

FIG. 11 shows a block diagram of an image display apparatus according to the present disclosure. An image signal and information of a type of the image are inputted into the apparatus. The image signal is inputted into a characteristic detection unit 1 and image signal processor (ISP) 2. The ISP 2 adjusts contrast, color, etc. of the inputted image signal, and sends the adjusted image signal to a panel correction unit 3. The panel correction unit 3 corrects characteristics of gamma, uniformity, spatial resolution (SPR), defects and mura correction (DeMura), Burn-In, voltage drop (IRdrop), etc. of the image signal, and sends the corrected image signal to an image signal improving unit 4. The characteristic detection unit 1 detects total luminance of the image from the inputted image signal, and sends information of the detected total luminance of the image to the image signal improving unit 4. It is possible to place the image signal improving unit 4 between the ISP 2 and the characteristic detection unit 1.

The image signal improving unit 4 inputs the corrected image signal, information of the total luminance of the image, and information of a type of the image (a still image or moving images), and outputs a driving signal. The driving signal is inputted into a gate driver controller 5 and a source driver controller 6, the gate driver controller 5 controls a gate driver 7 of a display panel 9 (an image displaying device), and the source driver controller 6 controls a source driver 8 of the display panel 9. The gate driver 7 and the source driver 8 displays an image on the display panel 9.

Figure 12:
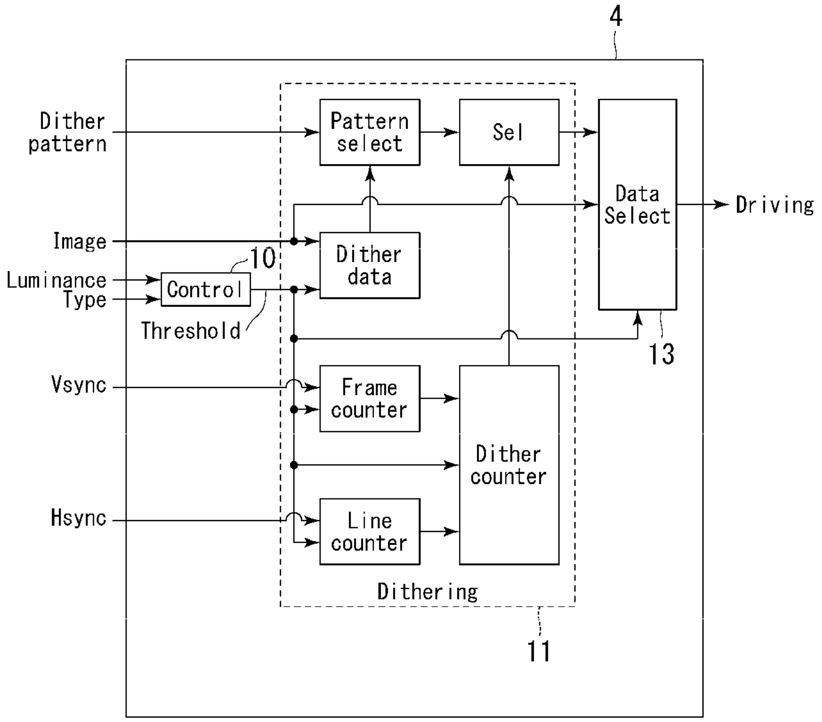
FIG. 12 shows a block diagram of an image quality improving unit according to the present disclosure.

FIG. 12 shows a block diagram of the image quality improving unit 4 according to the present disclosure. The image quality improving unit 4 comprises a threshold level determining unit 10, a dithering signal generating unit 11, and a selecting unit 13. The threshold level determining unit 10 determines the threshold level th in accordance with information of total luminance of the image and information of a type of the image. The dithering signal generating unit 11 compares the gray scale level of the image signal with the threshold level th, and generates a dithering signal when the gray scale level of the image signal is lower than the threshold level th. The selecting unit 13 selects the dithering signal and outputs a driving signal corresponding to the dithering signal when the gray scale level of the image signal is lower than the threshold level th. When the gray scale level of the image signal is higher than the threshold level th, the original image signal is selected and a driving signal corresponding to the original image signal is outputted. The outputted driving signal is sent to the gate driver controller 5 and the source driver controller 6.

Figure 13:
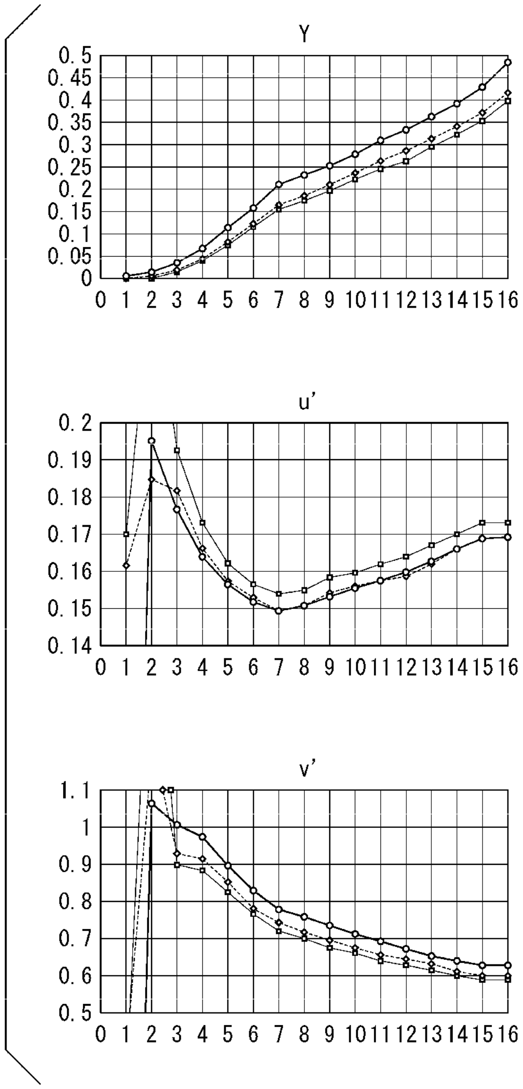
FIG. 13 shows simulation results of characteristics of a displayed image without an image quality improving unit.
Figure 14:
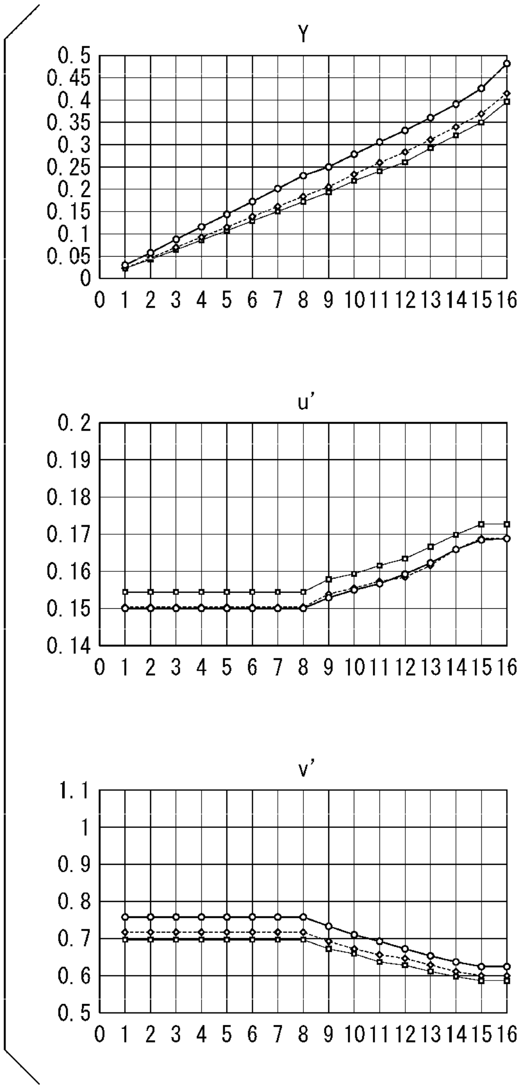
FIG. 14 shows simulation results of characteristics of a displayed image with an image quality improving unit.

The present disclosure improves gamma characteristics and color drift of the displayed image. FIG. 13 shows simulation results of luminance and color difference of the displayed image without the image quality improving unit 4 and FIG. 14 shows simulation results of luminance and color difference of the displayed image with the image quality improving unit 4.

Just noticeable color difference (JNCD) at the center position of the image is 178 without the image quality improving unit 4, whereas the JNCD is improved to be 3.4 with the image quality improving unit 4. Furthermore, JNCD at three points in the image is 1912 without the image quality improving unit 4, whereas the JNCD is improved to be 7.3 with the image quality improving unit 4.

Moreover, the present disclosure improves uniformity of luminance and color of the displayed image. For example, when a smart phone comprises a camera, an image taken by the camera is displayed on the display device as high quality images.

What is claimed is:

1. A method for displaying an image on an image displaying device, the method comprising:

comparing a gray scale level of an image signal for a light-emitting element of the image displaying device with a given threshold level, wherein the given threshold level is based on a type of the image and a total luminance of the image;

driving, when the gray scale level is higher than the given threshold level, the light-emitting element by a first driving signal corresponding to the gray scale level; and driving, when the gray scale level is lower than the given threshold level, the light-emitting element by a dithering driving signal including a second driving signal corresponding to the given threshold level.

2. The method of claim 1, wherein the given threshold level is a first threshold level when the type of the image is a still image and is a second threshold level when the type of the image is a moving image, and wherein first threshold level is greater than the second threshold level.

3. The method of claim 1, wherein the type of the image is a still image.

4. The method of claim 1, wherein the type of the image is a moving image.

5. The method of claim 1, wherein the dithering driving signal includes temporal dithering and spatial dithering.

6. The method of claim 1, wherein the dithering driving signal comprises temporal dithering or spatial dithering.

7. The method of claim 1, wherein the light-emitting element is an organic light-emitting diode (OLED).

8. An apparatus for displaying an image on an image displaying device, the apparatus comprising:

a memory configured to store instructions; and one or more processors coupled to the memory and configured to execute the instructions to cause the apparatus to:

determine a given threshold level based on a type of the image and a total luminance of the image;

compare a gray scale level of an image signal for a light emitting element of the image displaying device with the given threshold level;

select a first driving signal corresponding to the gray scale level when the gray scale level is higher than the given threshold level; or select a dithering driving signal including a second driving signal corresponding to the given threshold level when the gray scale level is lower than the given threshold level; and drive the light emitting element by the first driving signal or the dithering driving signal.

9. The apparatus of claim 8, wherein the given threshold level is a first threshold level when the type of the image is a still image and is a second threshold level when the type of the image is a moving image, and wherein first threshold level is greater than the second threshold level.

10. The apparatus of claim 8, wherein the type of the image is a still image.

11. The apparatus of claim 8, wherein the type of the image is a moving image.

12. The apparatus of claim 8, wherein the dithering driving signal comprises temporal dithering and spatial dithering.

13. The apparatus of claim 8, wherein the dithering driving signal comprises temporal dithering or spatial dithering.

14. The apparatus of claim 8, wherein the light emitting element is an organic light emitting diode (OLED).

15. A computer program product comprising computer-executable instructions for displaying an image on an image displaying device, the computer-executable instructions stored on a non-transitory computer-readable storage medium, wherein the computer-executable instructions when executed by one or more processors of an apparatus, cause the apparatus to:

determine a given threshold level based on a type of the image and a total luminance of the image;

compare a gray scale level of an image signal for a light emitting element of an image displaying device with the given threshold level;

select a first driving signal corresponding to the gray scale level when the gray scale level is higher than the given threshold level; or select a dithering driving signal including a second driving signal corresponding to the given threshold level when the gray scale level is lower than the given threshold level; and drive the light emitting element by the first driving signal or the dithering driving signal.

16. The computer program product of claim 15, wherein the given threshold level is a first threshold level when the type of the image is a still image and is a second threshold level when the type of the image is a moving image, and wherein first threshold level is greater than the second threshold level.

17. The computer program product of claim 15, wherein the type of the image is a moving image.

18. The computer program product of claim 15, wherein the dithering driving signal comprises temporal dithering and spatial dithering.

19. The computer program product of claim 15, wherein the dithering driving signal comprises temporal dithering or spatial dithering.

20. The computer program product of claim 15, wherein the light emitting element is an organic light emitting diode (OLED).

* * * * *